United States Patent

Salmanian

[19]

[11] Patent Number: 5,857,015
[45] Date of Patent: Jan. 5, 1999

[54] AUTOMATIC OPERATOR AND LAST-NUMBER-CREDIT

[75] Inventor: Mazda Salmanian, Kanata, Canada

[73] Assignee: Northern Telecom Limited, Montreal, Canada

[21] Appl. No.: 910,390

[22] Filed: Aug. 13, 1997

[51] Int. Cl.⁶ .................................................. H04M 15/00
[52] U.S. Cl. .......................... 379/127; 379/126; 379/121; 379/267; 379/114; 379/88.04
[58] Field of Search .................. 379/67, 68, 70, 379/88, 89, 112, 114, 115, 116, 119, 121, 126, 127, 260, 267, 67.1, 88.04, 88.16

[56] References Cited

U.S. PATENT DOCUMENTS 4,817,129  3/1989  Riskin .......................................... 379/88
5,204,894  4/1993  Darden ....................................... 379/88
5,369,685  11/1994  Kero ........................................... 379/67

*Primary Examiner*—Paul Loomis
*Attorney, Agent, or Firm*—Pascal & Associates

[57] ABSTRACT

A method of processing telephone calls comprising: receiving and storing a directory number of a called party with reference to a calling party, allocating a charge for the call on a billing list of a calling party, receiving a first signal from the calling party indicating a request for credit of the charge, automatically looking up data from the billing list to check against at least one predetermined criterion to determine whether the credit appears to be justified, upon receipt of the first signal, automatically applying the credit to the billing list in the event the at least one criterion is met, and automatically announcing the credit to the calling party, and automatically denying the credit in the event the at least one criterion is not met, and automatically announcing the denial to the calling party.

16 Claims, 2 Drawing Sheets

AUTOMATIC OPERATOR AND LAST-NUMBER-CREDIT

FIELD OF THE INVENTION

This invention relates to a method of processing telephone calls, and in particular to operation of an electronic operator.

BACKGROUND TO THE INVENTION

In the event a telephone subscriber misdials a number for which a charge is levied, in order to obtain credit for the charge, an operator must be dialed and the credit requested. However due to a reducing ratio of operators relative to the number of calls they must process, subscribers calling for operator service are typically placed in long queues, having to incur waits sometimes as long as several minutes to be served. Further, unfriendly operators are sometimes encountered, making a request for credit an unpleasant experience.

Further, operators can sometimes make mistakes as to whether credit should or should not have been granted, relying on the presumed honesty of the subscriber. In such cases, there is a possibility of fraud by the subscriber.

It would be desirable for telephone companies to provide very quick and reliable service to the subscriber, reducing or substantially eliminating the possibility of fraud, and reducing cost.

SUMMARY OF THE INVENTION

The present invention is a method of processing telephone calls which utilizes an electronic operator, and electronic lookup of aspects of a call in a database and comparing those aspects against predetermined criteria. One of the criteria can be for example that the call for which credit is being requested took no longer than a predetermined period of time such as two minutes. Another of the criteria can be that the same number had not been dialed within the last few, e.g. two, months, and/or had not been dialed in the same month of the previous year.

In accordance with another embodiment, the electronic operator can electronically present plural options to the subscriber, such as credit as described above, directory assistance, wake up call service, etc., by synthesized voice instructions from the electronic operator and response by the subscriber dialing dual tone multifrequency (DTMF) response signals from his station set keyboard.

In accordance with an embodiment of the present invention, a method of processing telephone calls comprises (a) receiving and storing a directory number of a called party with reference to a calling party, (b) allocating a charge for the call on a billing list of a calling party, (c) receiving a first signal from the calling party indicating a request for credit of the charge, (d) electronically looking up data from the billing list to check against at least one predetermined criterion to determine whether the credit appears to be justified, upon receipt of the first signal, (e) electronically applying the credit to the billing list in the event the at least one criterion is met, and electronically announcing the credit to the calling party, and (f) electronically denying the credit in the event the at least one criterion is not met, and electronically announcing the denial to the calling party.

In accordance with another embodiment, a method of processing telephone calls comprises (i) receiving a signal from a calling subscriber indicating a request for electronic operator service, (ii) electronically providing a predetermined message to the calling party, the message listing predetermined services and corresponding digits to be dialed in order to access the service, (iii) receiving dialed digits as a request for electronic directory assistance, (iv) receiving a plurality of dialed digits representing a name and location of a prospective called party, (v) electronically looking up a directory number of the prospective called party in a database, corresponding to the plurality of dialed digits, and (vi) providing the directory number to the calling subscriber in the event the directory number is successfully located.

BRIEF INTRODUCTION TO THE DRAWINGS

A better understanding of the invention will be obtained from an understanding of the detailed description below, with reference to the following drawings, in which:

FIG. 1 is a block diagram of a representative telephone system on which the present invention can be carried out, and FIG. 2 illustrates a flow chart combining two embodiments of the invention.

DETAILED DESCRIPTION OF EMBODIMENTS OF THE INVENTION

Figure 1:
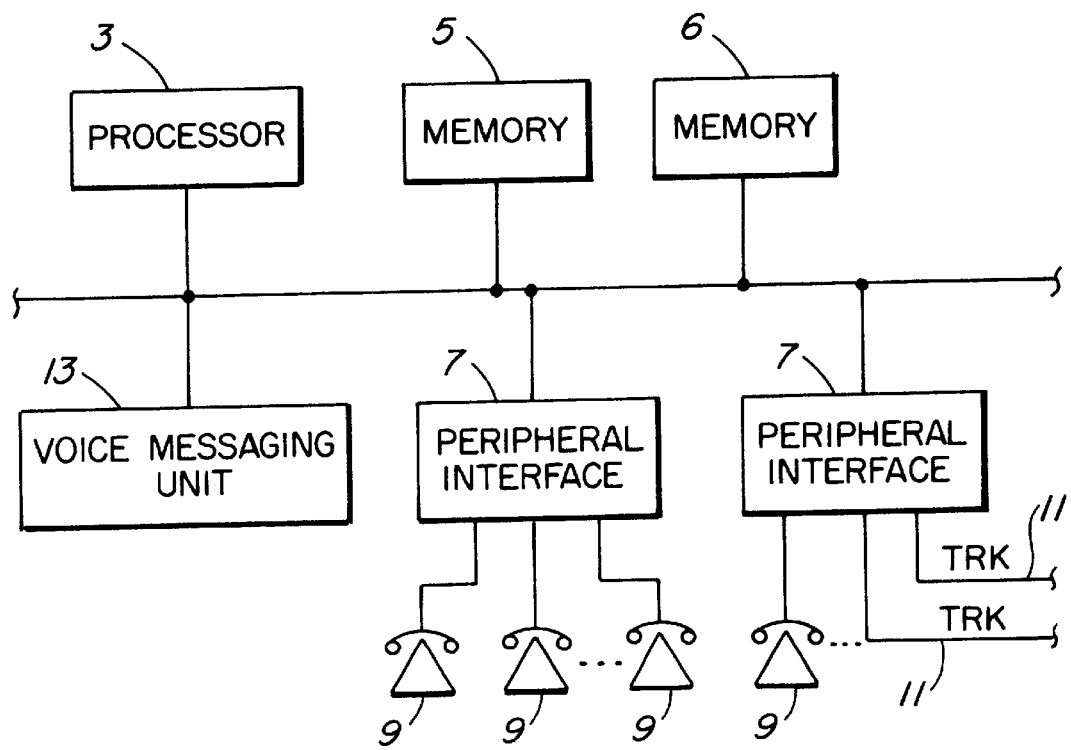

Turning to FIG. 1, a telephone system is shown which can carry out the present invention. The system includes a bus 1, a processor 3, and a memory 5 for storage of software programs and operation data used by the processor to control the processing of telephone calls by the system. A memory 6 which can be accessed via bus 1 which stores databases such as correspondence of actual line locations to dialed digits, preference lists of trunks to other switching systems based on predetermined dialed digits, lists of dialed numbers for which tolls are allocated against the directory number of a subscriber (e.g. for billing purposes), the last number dialed against the directory number of a subscriber (e.g. for last number recall service), etc. It can also store a subscriber directory with correlations of directory numbers to the identities and addresses of the subscribers.

Peripheral interfaces 7 are in communication with the bus 1, to which peripherals such as station sets 9 and trunks 11 are connected. The peripheral interfaces can also perform digital to analog (D/A) and analog to digital (A/D) conversion, for communication with analog telephone sets if necessary and using digital signals carried by the switching system. A digital voice messaging service unit 13 is also connected to the bus 1.

It should be recognized that the system described above is representative only, and subsystem parts such as line and trunk circuits, switching matrixes if used, circuit and message communication circuits, etc. have not been shown, since the structure and operation of electronic processor controlled systems have long been known by persons skilled in the art and a detailed description is considered to be redundant.

However in general in the system used, and ignoring D/A and A/D conversion, data signals corresponding to DTMF signals keyed in by a subscriber using telephone set 9 and designating a called subscriber are transferred via peripheral interface 7 and bus 1 to processor 3, which, under control of software programs stored in memory 5, finds the location of the called telephone line (or the location of an interoffice trunk), causes a ringing signal to be applied by the peripheral interface (or by a remote switching office) to the called line, monitors the line or trunk, and when the called telephone set answers the call (goes off-hook), designates a two way channel on bus 1 through which communication can be effected using a standard protocol. The peripheral interface is instructed to place the signals between telephone sets or a trunk and a telephone set within the designated channel, in order to provide the requested communication service.

Assuming that the subscriber dials a toll call, the processor 3 receives the dialed digits designating the called directory number, controls connection of the calling and called subscribers as described above, and stores the dialed number with the time of the beginning of the connection in a database in memory 6. When the call has been terminated, the processor 3 records the completion time, calculates a toll charge, and stores the time and charge in the database against the directory number of the calling subscriber. The start time, the duration of the call, and the charge are recorded for billing and archival purposes.

In addition, the last number dialed is recorded for the purposes of recall, in case the subscriber has purchased and wishes to use service for speed dialing the last number. The last number dialed can be stored in a separate database in memory 6 or can be picked up from the database noted in the previous paragraph. Memories 5 and 6 may be combined if desired.

Figure 2:
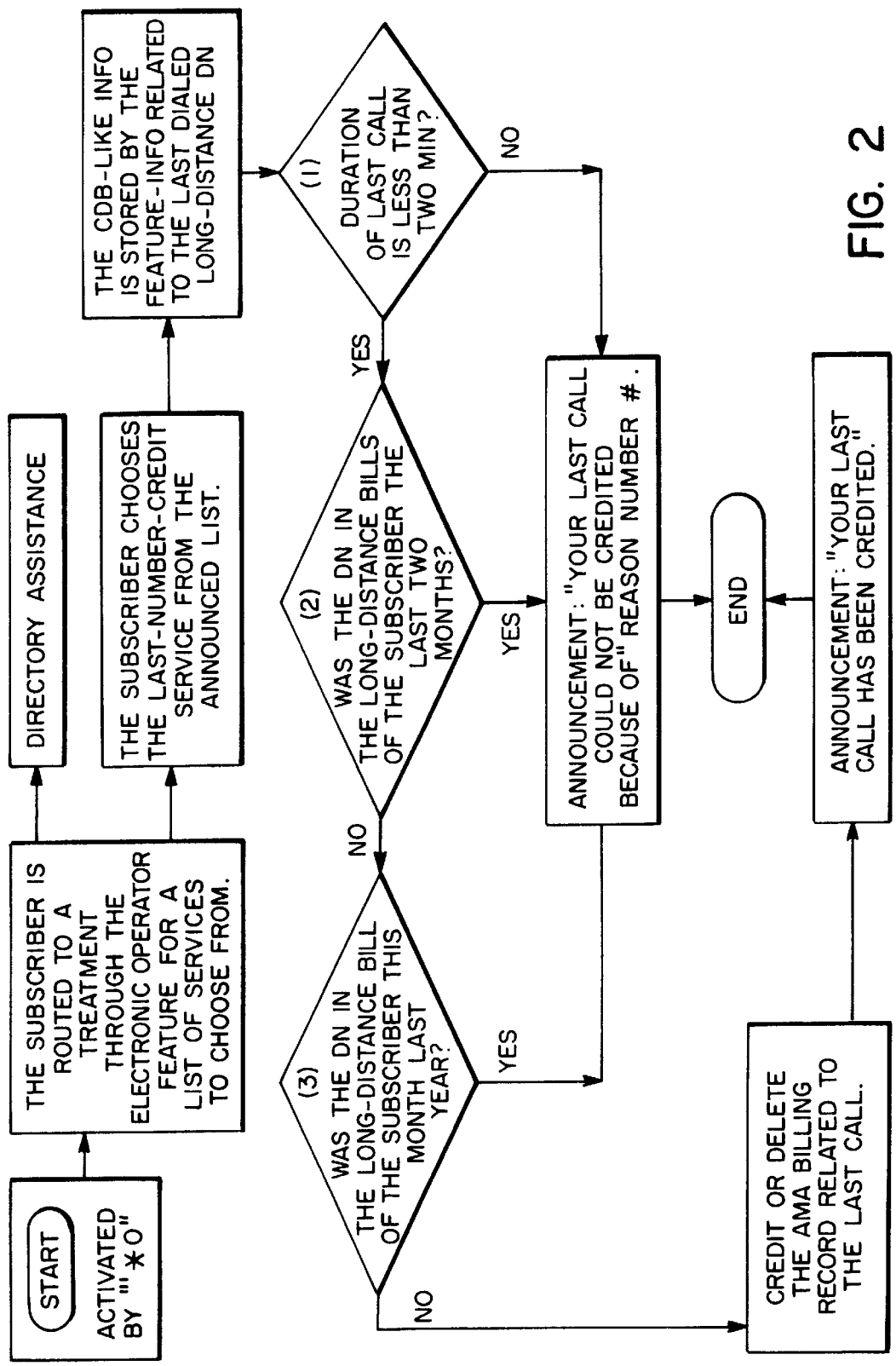

With reference to the flowchart shown in FIG. 2, outlining the basic steps of the method, and ignoring the steps of the second and third blocks in the flowchart, assume that the subscriber has misdialed the directory number which has attracted a charge. In accordance with an embodiment of the present invention, the subscriber dials a special number, such as a special operator number "*0" or some other predetermined number, but instead of the subscriber being queued for pick up of the call by a live operator by a subscriber dialing "0" as in the prior art, the processor interprets this as a request for refund of the toll charge. The processor can send control messages to the voice messaging unit 13 to electronically voice a message and can control the message transmission via a channel to the subscriber, which indicates "One moment please; the call is being checked."

The processor then checks the call against at least one of several criteria. One of the criteria can be the duration of the immediately preceding toll call stored in the aforenoted database of memory 6. If the call is less than a predetermined time, e.g. two minutes, the credit can be made. Another of the criteria can be that the same called number was not dialed within the preceding two months. Another of the criteria can be that the same called number was not dialed within the same month of the preceding year.

In the event that the record of the call passes the criteria, the processor proceeds to erase record of the call in the database of memory 6, and sends a message to voice messaging unit 13 instructing it to synthesize another predetermined message, such as "The charges of the previous call have been credited to your account.", and controls a communication path from the voice messaging unit to the calling subscriber for transmission of the message.

It should be noted that any or all of the above criteria, or others, can be used to determine whether the charges for the call should be credited.

Since the live operator has been removed from the process, and the service implemented using electronic apparatus, ongoing costs of a live operator can be eliminated. Further, the loads on the live operators can be reduced, and since no queuing for a live operator is required, fast service is provided to the subscriber. In addition, since standard messages are provided by the voice messaging unit, unfriendly live service is eliminated. Since predetermined criteria are used to determine whether or not the cost of a call should be credited, accuracy is improved as reliance on the work habits of a live operator is avoided. The result is improvement in operation for both the telephone company and the subscriber.

There may be occasions when the subscriber is not content with the electronic operator. For example, if the criterion or criteria are not met, the voice messaging unit can synthesize the message "Sorry, credit for the call is denied." If the subscriber has truly misdialed the number, he may wish to contact a live operator. In that case he can dial "0", and the processor, recognizing the digit, connects the calling subscriber to a live operator (which may use one of the station sets 9, or a more elaborate station set such a computer-controlled telephone).

The electronic operator process described above may be extended to provide other services, such as directory assistance, wake up call, etc. In this case, when the subscriber dials "*0", instead of the processor responding immediately with a process to credit the cost of the immediately preceding call, it causes the voice messaging unit 13 to voice a list of electronic operator features, with the appropriate dialing codes to access them, as shown in the second and third steps of the flowchart of FIG. 2. For example, the message voiced can be "This is your electronic operator. To obtain credit for the charge of the preceding call, dial *1; to obtain wake-up call service, dial *2; to obtain directory assistance, dial *3 . . . (etc.)"

In order to obtain credit for the charge of the preceding call, the subscriber then dials *1. The processor in detecting these digits, processes the call as described above in the preceding embodiment.

Assuming for example that the subscriber would like directory assistance, he dials *3. The processor in receiving these dialed digits, instructs the voice messaging unit to voice the standard message "Please dial the area code of the number you would like". The subscriber responds by dialing the area code of the subscriber for which he wishes the directory number, which is stored in memory 7 by the processor.

The voice messaging system is then instructed to voice the standard message "Please designate the city of the number you would like, by using the letters on the keypad". The subscriber responds by dialing the city of the subscriber for which he wishes the directory number, which is stored in memory 7 by the processor.

The voice messaging system is then instructed to voice the standard message "Please designate the surname of the subscriber whose number you would like, by using the letters on the keypad". The subscriber responds by dialing the surname of the subscriber for which he wishes the directory number, which is stored in memory 7 by the processor.

The voice messaging system is then instructed to voice the standard message "Please designate the initials or given name of the subscriber whose number you would like, by using the letters on the keypad". The subscriber responds by dialing the initials or given name of the subscriber for which he wishes the directory number, which is stored in memory 7 by the processor.

The processor then looks up the area code, city and name keyed in by the subscriber in a database directory in memory 6, obtains the directory number and passes it to voice messaging unit 13 with an instruction to voice the standard message "The number you have requested is xxxxxxx", and connects a channel between the voice messaging unit and the subscriber's line to carry the message.

In a similar manner the electronic operator can request the subscriber to key in room or extension number or directory number, wake-up time, etc., and can repeat the information keyed in by voice messaging system, requesting a yes or no response to the accuracy of the information or a selection response (e.g. dial 1 for am and dial 2 for p.m.) or for any other information from the subscriber.

The present invention thus can provide operator services in a standard and automatic manner, avoiding the requirement for queuing, unfriendly responses, etc. and increasing the accuracy by avoiding natural mistakes that can be made by a live operator.

A person skilled in the art understanding the above description may now consider other embodiments using the principles described above. All such embodiments which are within the spirit and scope of the claims appended hereto are considered to be part of the present invention.

I claim:

1. A method of processing telephone calls comprising:
   (a) receiving and storing a directory number of a called party with reference to a calling party,
   (b) allocating a charge for the call on a billing list of a calling party,
   (c) receiving a first signal from the calling party indicating a request for credit of the charge,
   (d) automatically looking up data from the billing list to check against at least one predetermined criterion to determine whether the credit appears to be justified, upon receipt of the first signal,
   (e) automatically applying the credit to the billing list in the event the at least one criterion is met, and automatically announcing the credit to the calling party, and
   (f) automatically denying the credit in the event the at least one criterion is not met, and automatically announcing the denial to the calling party.

2. A method as defined in claim 1, including the further step (g) of receiving a further signal from the calling party requesting access to a live operator, and automatically connecting the calling party to the live operator.

3. A method as defined in claim 1 in which checking the looked up data against at least one criterion includes checking directory numbers previously dialed by the calling party, and determining that the at least one predetermined criterion is met in the event said directory number of the called party had not previously been dialed by the calling party.

4. A method as defined in claim 1 in which the at least one predetermined criterion includes the length of a call for which credit is requested not extending for more than a predetermined period of time.

5. A method as defined in claim 4 in which checking the looked up data against at least one criterion includes checking directory numbers previously dialed by the calling party, and determining that the at least one predetermined criterion is met in the event said directory number of the called party had not previously been dialed by the calling party.

6. A method as defined in claim 5 in which the at least one predetermined time interval is at least one of previous two months and a same month of the previous year.

7. A method as defined in claim 1 including the steps, prior to receipt of the first signal,
   (g) receiving a signal indicating a request for automatic operator service,
   (h) automatically providing a predetermined message to the calling party, the message listing predetermined services and corresponding digits to be dialed in order to access said services, and
   (i) receiving at least one of said dialed digits as said first signal.

8. A method of processing telephone calls comprising:
   (i) receiving a signal from a calling subscriber indicating a request for electronic operator service,
   (ii) electronically providing a predetermined message to the calling party, the message listing predetermined services and corresponding digits to be dialed in order to access the service,
   (iii) receiving dialed digits as a request for electronic directory assistance,
   (iv) receiving a plurality of dialed digits representing a name and location of a prospective called party,
   (v) electronically looking up a directory number of the prospective called party in a database, corresponding to the plurality of dialed digits,
   (vi) providing the directory number to the calling subscriber in the event the directory number is successfully located,
       including prior to receiving a signal for the calling subscriber indicating a request for electronic operator service,
   (a) receiving and storing a directory number of a called party with reference to a calling party,
   (b) allocating a charge for the call on a billing list of a calling party,
       carrying out steps (i) and (ii),
       receiving another of said dialed digits as a request for a service of providing credit of the charge,
   (c) electronically looking up data from the billing list to check against at least one predetermined criterion to determine whether the credit appears to be justified, upon receipt of the first signal,
   (d) electronically applying the credit to the billing list in the event the at least one criterion is met, and electronically announcing the credit to the calling party, and
   (e) electronically denying the credit in the event the at least one criterion is not met, and electronically announcing the denial to the calling party.

9. An apparatus for processing telephone calls comprising:
   (a) means for receiving and storing a directory number of a called party with reference to a calling party,
   (b) means for allocating a charge for the call on a billing list of a calling party,
   (c) means for receiving a first signal from the calling party indicating a request for credit of the charge,
   (d) means for automatically looking up data from the billing list to check against at least one predetermined criterion to determine whether the credit appears to be justified, upon receipt of the first signal,
   (e) means for automatically applying the credit to the billing list in the event the at least one criterion is met, and automatically announcing the credit to the calling party, and
   (f) means for automatically denying the credit in the event the at least one criterion is not met, and automatically announcing the denial to the calling party.

10. An apparatus as defined in claim 9, including the further step (g) of receiving a further signal from the calling party requesting access to a live operator, and automatically connecting the calling party to the live operator.

11. An apparatus as defined in claim 9 in which checking the looked up data against at least one criterion includes checking directory numbers previously dialed by the calling party, and determining that the at least one predetermined criterion is met in the event said directory number of the called party had not previously been dialed by the calling party.

12. An apparatus as defined in claim 9 in which the at least one predetermined criterion includes the length of a call for which credit is requested not extending for more than a predetermined period of time.

13. An apparatus as defined in claim 12 in which checking the looked up data against at least one criterion includes checking directory numbers previously dialed by the calling party, and determining that the at least one predetermined criterion is met in the event said directory number of the called party had not previously been dialed by the calling party.

14. An apparatus as defined in claim 13 in which the at least one predetermined time interval in at least one of previous two months and a same month of the previous year.

15. An apparatus as defined in claim 9 including the steps, prior to receipt of the first signal,
- (g) receiving a signal indicating a request for automatic operator service,
- (h) automatically providing a predetermined message to the calling party, the message listing predetermined services and corresponding digits to be dialed in order to access said services, and
- (i) receiving at least one of said dialed digits as said first signal.

16. An apparatus for processing telephone calls comprising:
- (i) means for receiving a signal from a calling subscriber indicating a request for electronic operator service,
- (ii) means for electronically providing a predetermined message to the calling party, the message listing predetermined services and corresponding digits to be dialed in order to access the service,
- (iii) means for receiving dialed digits as a request for electronic directory assistance,
- (iv) means for receiving a plurality of dialed digits representing a name and location of a prospective called party,
- (v) means for electronically looking up a directory number of the prospective called party in a database, corresponding to the plurality of dialed digits, and
- (vi) means for providing the directory number to the calling subscriber in the event the directory number is successfully located,
    including the steps, prior to receiving a signal for the calling subscriber indicating a request for electronic operator service,
- (a) means for receiving and storing a directory number of a called party with reference to a calling party,
- (b) means for allocating a charge for the call on a billing list of a calling party,
    carrying out steps (i) and (ii),
    means for receiving another of said dialed digits as a request for a service of providing credit of the charge,
- (c) means for electronically looking up data from the billing list to check against at least one predetermined criterion to determine whether the credit appears to be justified, upon receipt of the first signal,
- (d) means for electronically applying the credit to the billing list in the event the at least one criterion is met, and electronically announcing the credit to the calling party, and
- (e) means for electronically denying the credit in the event the at least one criterion is not met, and electronically announcing the denial to the calling party.

* * * * *